(12) United States Patent
Sturm et al.

(10) Patent No.: US 10,784,747 B2
(45) Date of Patent: Sep. 22, 2020

(54) ELECTRIC MOTOR WITH IMPROVED COOLING HAVING V-SHAPED FINS ON A ROTOR FACING RADIALLY EXTENDING FINS ON A STATOR

(71) Applicant: ebm-papst Mulfingen GmbH & Co. KG, Mulfingen (DE)

(72) Inventors: Michael Sturm, Bad Mergentheim (DE); Werner Müller, Mulfingen-Seidelklingen (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 178 days.

(21) Appl. No.: 15/573,600

(22) PCT Filed: Oct. 24, 2016

(86) PCT No.: PCT/EP2016/075532
§ 371 (c)(1),
(2) Date: Nov. 13, 2017

(87) PCT Pub. No.: WO2017/076677
PCT Pub. Date: May 11, 2017

(65) Prior Publication Data
US 2018/0123428 A1    May 3, 2018

(30) Foreign Application Priority Data
Nov. 2, 2015   (DE) .................. 10 2015 118 695

(51) Int. Cl.
*H02K 9/08* (2006.01)
*H02K 1/27* (2006.01)
(Continued)

(52) U.S. Cl.
CPC .......... *H02K 9/08* (2013.01); *H02K 1/2786* (2013.01); *H02K 5/18* (2013.01); *H02K 5/20* (2013.01); *H02K 9/22* (2013.01); *H02K 5/10* (2013.01)

(58) Field of Classification Search
CPC .. H02K 9/00; H02K 9/08; H02K 9/02; H02K 9/04; H02K 9/06; H02K 9/22; H02K 5/10;
(Continued)

(56) References Cited

U.S. PATENT DOCUMENTS 6,384,494 B1 *   5/2002   Avidano .................. H02K 9/06
                                                      310/58
6,798,098 B1 *   9/2004   Tai ....................... F04D 25/088
                                                      310/52
(Continued)

FOREIGN PATENT DOCUMENTS

DE          10313273 A1    10/2004
DE     202015105804 U1    12/2015
(Continued)

OTHER PUBLICATIONS

International Search Report (in German with English Translation) for PCT/EP2016/075532, dated Feb. 15, 2017; ISA/EP.

*Primary Examiner* — Maged M Almawri
(74) *Attorney, Agent, or Firm* — Harness, Dickey & Pierce, P.L.C.

(57) ABSTRACT

The invention relates to an electric motor, particularly an "external rotor motor", comprised of a stator housing and a rotor housing which is rotatable with respect to the stator housing, wherein the rotor housing has a cooling ring disposed on its side which axially faces the stator housing, wherein the stator housing and the cooling ring are each provided with a plurality of first and second cooling fins (the second cooling fins also being referred to as "cooling ribs")
(Continued)

Figure 1:
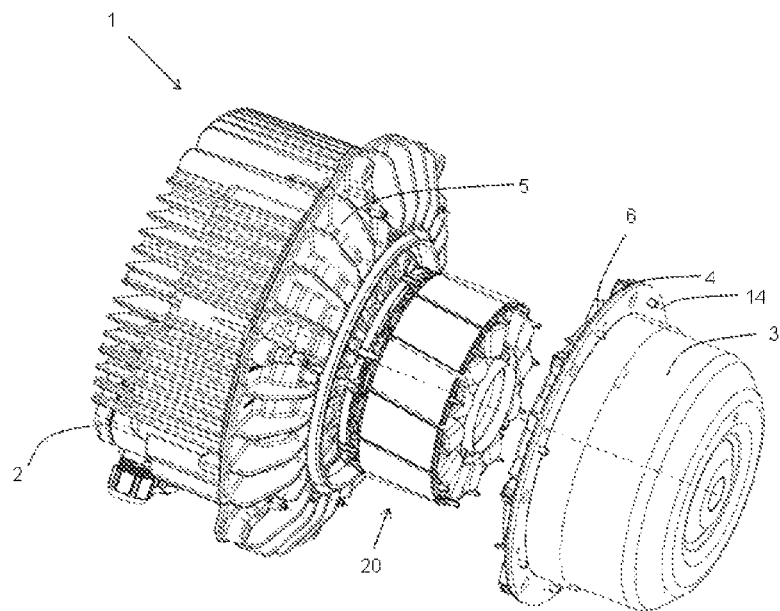

which face each other axially and are disposed so as to be distributed in the respective circumferential directions, which fins/ribs collaborate in flow technology when the rotor housing is in rotating operation; wherein, in an axial plan view, the first cooling fins extend radially outwardly, and the second cooling fins (the cooling ribs) are V-shaped and point in the circumferential direction, wherein a rotary relative movement of the first and second cooling fins (the cooling fins and the cooling ribs) generates a cooling air stream, at least between the stator housing and the rotor housing.

15 Claims, 4 Drawing Sheets

(51) Int. Cl.
*H02K 5/18* (2006.01)
*H02K 5/20* (2006.01)
*H02K 9/22* (2006.01)
*H02K 5/10* (2006.01)

(58) Field of Classification Search
CPC .. H02K 5/12; H02K 5/18; H02K 5/20; H02K 1/2786
USPC ............. 310/52, 59, 58, 60 R, 61, 216.056
See application file for complete search history.

(56) References Cited

U.S. PATENT DOCUMENTS

| | | | | |
|---|---|---|---|---|
| 7,579,742 B1* | 8/2009 | Rittenhouse | ........... | H02K 1/141 310/257 |
| 8,531,065 B2* | 9/2013 | Knorr | ................. | H02K 1/2786 310/58 |
| 8,821,129 B2* | 9/2014 | Heli | ..................... | B01D 46/001 416/247 R |
| 9,022,753 B2* | 5/2015 | Streng | ................... | F04D 25/082 417/366 |
| 9,450,474 B2* | 9/2016 | Haag | ......................... | H02K 5/20 |
| 9,488,181 B2* | 11/2016 | Parodi | ................... | F04D 19/002 |
| 9,538,686 B2* | 1/2017 | Sturm | ...................... | H02K 9/08 |
| 9,621,010 B2* | 4/2017 | Stillger | .................... | H02K 5/18 |
| 9,876,410 B2* | 1/2018 | Sauer | ................... | H02K 5/1675 |
| 2008/0136272 A1* | 6/2008 | Ishikawa | ................ | H02K 1/145 310/58 |
| 2011/0148230 A1* | 6/2011 | Knorr | .................. | H02K 1/2786 310/62 |
| 2012/0062052 A1* | 3/2012 | Best | ........................ | H02K 5/10 310/43 |
| 2013/0278094 A1* | 10/2013 | Peterson | ................ | H02K 1/187 310/64 |
| 2015/0295471 A1* | 10/2015 | Iwai | ........................ | H02K 9/06 310/62 |
| 2015/0303753 A1* | 10/2015 | Huang | .................. | H02K 1/185 310/62 |
| 2016/0181891 A1* | 6/2016 | Fogle | ........................ | B25F 5/02 310/43 |
| 2017/0194833 A1* | 7/2017 | Bang | ........................ | H02K 7/003 |
| 2017/0366061 A1* | 12/2017 | Looi | ........................ | H02K 5/02 |

FOREIGN PATENT DOCUMENTS

| | | |
|---|---|---|
| EP | 2337186 A1 | 6/2011 |
| EP | 2429067 A1 | 3/2012 |

* cited by examiner

ELECTRIC MOTOR WITH IMPROVED COOLING HAVING V-SHAPED FINS ON A ROTOR FACING RADIALLY EXTENDING FINS ON A STATOR

CROSS REFERENCE TO RELATED APPLICATIONS

This application is a U.S. National Phase Application under 35 U.S.C. 371 of International Application No. PCT/EP2016/075532 filed on Oct. 24, 2016 and published in German as WO 2017/076677 A1 on May 11, 2017. This application claims priority to German Application No. 10 2015 118 695.0 filed on Nov. 2, 2015. The entire disclosures of all of the above applications are incorporated herein by reference.

The invention relates to an electric motor, particularly an "external rotor motor", comprised of a stator housing and a rotor housing which is rotatable with respect to the stator housing, wherein the rotor housing has a cooling ring on its side which axially faces the stator housing.

In electric motors which rotate at high rotational speeds, sufficient cooling is of great importance. Particularly in the case of closed (or encapsulated) motor housings which meet high IP protection standards (protection against penetration of liquids and solids under various International Protection Codes), where the stator housing is closed and the external rotor motor is disposed axially adjoining and facing the stator housing, there remains only a narrow ring-shaped gap in which a cooling flow can be generated between the stator housing and the external rotor; typically, this gap is sealed by labyrinthine seal means. An electric motor of this general type is disclosed in DE 10313274 A1.

In the prior art, typically a cooling ring is provided which has straightly radially outwardly extending cooling ribs which can rotate past straight radially outwardly extending cooling fins on the stator housing. With this arrangement, at certain rotational speeds a whistling noise can develop due to the interaction of the cooling ribs of the cooling ring with the cooling fins of the cylindrical stator configuration; this whistling has usually been corrected by changing the number of cooling fins in relation to the number of cooling ribs.

The object of the present invention was to devise an electric motor which has improved cooling, un-reduced cooling efficiency, and unobjectionable noise development, at high rotational speeds.

This object is achieved by the combination of features according to patent claim 1.

According to the invention, in an electric motor, particularly an "external rotor motor", comprised of a stator housing and a rotor housing which is rotatable with respect to the stator housing, wherein the rotor housing has a cooling ring disposed on its side which side axially faces the stator housing, the stator housing and the cooling ring are each provided with a plurality of first and second cooling fins (the second cooling fins also being referred to as "cooling ribs") which face each other axially and are disposed so as to be distributed in the respective circumferential directions, which fins/ribs collaborate in flow technology when the rotor housing is in rotating operation. In an axial plan view, the first cooling fins extend radially outwardly. Further in an axial plan view, the second cooling fins (the cooling ribs) are V-shaped and their apices point in the circumferential direction, so that a rotary relative movement of the first and second cooling fins (the cooling fins and the cooling ribs) generates a cooling air stream, at least between the stator housing and the rotor housing. The rotating cooling ribs thus themselves act as cooling fins.

With such a configuration, the cooling fins on the stator housing and the cooling ribs on the rotor housing are no longer disposed parallelly in a plane. As the V-shaped cooling fins (cooling ribs) are moved, they cross the radially outwardly extending and axially spaced cooling ribs (cooling fins). According to the invention, the V-shaped cooling ribs or the radially outwardly extending cooling fins may be disposed either on the stator housing or on the rotor housing. The effect is provided by the kinematic reverse movement (relative opposite movement).

The essentially orthogonal orientation and movement of the cooling fins and cooling ribs with respect to each other in the circumferential direction reduces the development of noise at low as well as high rotational speeds, with measured noise levels being reduced by half. Depending on the size of the components, the noise reduction is by 2 to 4 dB. Also, the power needed to rotate the cooling ring is reduced, particularly at high rotational speeds, and thus the total power consumption of the electric motor is reduced, thereby providing improved overall efficiency of the electric motor. The magnitude of the cooling effect is nearly unchanged in comparison to ordinary configurations, particularly those according to the above-described prior art. A further advantage is that the customary components can be employed, given that only the cooling ring needs to be adapted in order to realize the invention in a certain exemplary embodiment. Finally, the cooling ring itself can be retrofitted, and can be installed on a variety of electric motors.

According to a preferred embodiment, accordingly, the cooling ribs which are V-shaped in an axial plan view are disposed on the rotating cooling ring in a unit construction. The radially extending, preferably straightly outwardly extending cooling ribs are then fixedly mounted on the stator housing.

In a variant, the cooling ring may be provided as an extra component, or alternatively may be integrated into a flange of the rotor housing. With the latter configuration, the number of parts is reduced, along with the assembly cost.

According to an advantageous embodiment, it is provided that each pair of neighbouring V-shaped cooling ribs have their respective apices directed toward each other in the circumferential direction. This provides maximal noise reduction. Further, the arrangement is not dependent on the direction of rotation.

According to an advantageous refinement of the invention. the total number of the radially outwardly extending cooling fins is greater than the total number of the V-shaped cooling ribs, by a factor of 1.2 to 1.8, particularly a factor of 1.5. If and to the extent that mounting screws or mounting pockets are provided on the cooling ring, which screws or pockets have effects similar to a cooling fin, the number of V-shaped cooling ribs can be reduced accordingly. In this way, a high cooling effect can be achieved even at high rotational speeds. The described factors correspond to i.e. facilitate an optimal adjustment of the cooling fins and cooling fins with respect to each other. As an example, 32 fixed cooling fins may be provided on the stator housing and 21 V-shaped cooling ribs (also referred to as "cooling wings") may be provided on the cooling ring.

According to an advantageous embodiment, the legs of the V-shaped cooling ribs have mirror symmetry with respect to a circumferential line of the cooling ring. With this arrangement, the respective apices of the V-shaped cooling rings end in the radial middle on the cooling, i.e. on a "middle diameter" S of a cooling rib, which is determined by half the sum of the outer diameter D of the cooling ribs and the inner diameter d of the V-shaped cooling ribs (S=(D+d)/2). In alternative solutions, there may be a deviation radially inwardly or outwardly from this by ±5%.

According to another advantageous embodiment, the cooling ribs which have a V-shape when viewed in an axial plan view extend up to a radially outer edge of the cooling ring, and their ends are flush with said outer edge. With this arrangement, the outer diameter of the cooling ribs and the outer diameter of the cooling ring coincide.

According to an advantageous refinement, the legs of the V-shaped cooling ribs have a leg thickness t of 0.8 to 3 mm, particularly 1 to 2 mm. The "leg thickness" is defined as the material thickness of the legs in an axial plan view. According to another advantageous embodiment, the leg thickness corresponds to an axial thickness of the cooling ring without the cooling ribs or other attachments.

According to another variant embodiment, it is provided that the angular separation W1 between neighbouring mutually facing V-shaped cooling ribs is determined by the number of V-shaped cooling ribs, wherewith the angular separation W1 can be calculated from the formula:

Angular separation $W1=360°/$(Total number of $V$-shaped cooling ribs)/2.

E.g., in the case of 22 V-shaped cooling ribs on the cooling ring, this formula gives an angular separation W1=8.2°. In measuring this value, the measurement should always be at the same point on the respective V-shaped cooling rib.

In addition, the inventive electric motor is positively influenced if the angle of opening W2 of the V-shaped cooling ribs, i.e. the angle enclosed by the "V", has a value in a range of 50–90°, preferably 60-80°, particularly preferably and angle of 60°. The opening angle W2 influences the flow between the cooling fins of the stator housing and the cooling ribs of the rotor housing, and contributes to reducing the power consumption by the cooling ring and also to reducing noise without reducing the cooling power.

According to an advantageous embodiment of the electric motor, it is also provided that the angular separation W3 in the circumferential direction between two neighbouring tips (apices) of V-shaped cooling ribs which tips are directed toward each other is at least 8°. If the spacing is less, the noise which develops is greater. In addition, the available space between the cooling ribs is very small. E.g., the space available for an attachment hole for screw fastening, and the space available for the associated screw head, may be insufficient.

In the electric motor the stator housing and rotor housing are disposed close to each other, and form a ring-shaped gap between them; the cooling fins and cooling ribs are disposed opposite to each other in this gap. In an advantageous configuration, it is provided that the axial spacing A determined by the open width (gap) between the axially opposite fins, namely the radially outwardly extending fins on the one hand and the V-shaped cooling ribs on the other hand, has a minimum value which is lower by factor of at least 0.015 times the outer diameter D of the cooling ring, i.e. $A_{min}$D*0.015. The spacing A determines the air space available for the cooling air stream. To the extent it remains within the prescribed range, the advantageous effects of noise reduction and high cooling power are achieved. The maximum spacing is Amax=$A_{min}$×1.5; otherwise there is excessive reduction in the cooling power.

Further, it has been found to be axially advantageous if the axial height H of the cooling ribs is greater than the axial spacing A by a factor of 2 to 2.5.

In an embodiment which is advantageous for the flow conditions, the cooling ring bears only the V-shaped cooling ribs on its surface which faces the stator housing, so that the flow is generated without being influenced by un-defined disturbing edges. If and to the extent that the cooling ring is provided as a separate component part, it may be attached to the rotor housing by, e.g., form-interlocking connections (catch connections). The rotary ventilation impeller may be realized through threaded studs or threaded inserts, for example.

According to a refinement of the invention, it is also provided that an inlet nozzle (inlet nozzle element) in the form of a ring-shaped disc is disposed on the radially outwardly extending cooling fins, the surface of which disc which faces the V-shaped cooling ribs is smooth (even) or has a corrugated shape. The inlet nozzle separates the cooling fins of the stator housing and the cooling ribs of the rotor housing, as regards flow technology, at least in some areas, so that noise development through the interaction of these components can be avoided. The inlet nozzle can be attached to the cylindrical structure of the stator by screw means or by interlocking hook means. If screw means are used, the inlet nozzle will be provided with countersink holes, so that the fastening means will not influence the flow surfaces facing the V-shaped cooling ribs.

According to an advantageous embodiment, the inlet nozzle has a shape which is complementary to the radially outwardly extending cooling fins, wherewith said inlet nozzle is disposed against said radially outwardly extending cooling fins over its (the nozzle's) entire radial extent. To the extent that the radially outwardly extending cooling fins have an axial displacement in their extent, the inlet nozzle is configured accordingly, and thus may be at least partly convex or concave. In general, the inlet nozzle reflects the axial surface geometry of the V-shaped cooling ribs.

According to an exemplary embodiment, the inlet nozzle, in a radially middle region, is disposed against the radially outwardly extending cooling fins, such that said radially outwardly extending cooling fins extend beyond the inlet nozzle on both sides in the radial direction. The radial regions of the opposing cooling ribs which are disposed inwardly and outwardly of the inlet nozzle are thus free of the inlet nozzle. This can give rise to an aerodynamic aspiration nozzle in the ring-shaped gap.

The inlet nozzle serves as a kind of cover plate which is independent of the V-shaped cooling ribs, so that a defined and oriented air flow can be produced, and a maximum cooling effect can be achieved. The preferred material for the inlet nozzle is plastic. The inlet nozzle may be attached to the stator housing by means of screws, form-interlocking connections (catch connections), or press connections.

All of the features which are disclosed may be combined, basically in any desired combination, to the extent that such a combination is technically possible.

Other advantageous refinements of the invention will be set forth in the dependent claims, and/or will be represented in more detail hereinbelow along with the description of a preferred embodiment of the invention, with reference to the drawings.

Figure 2:
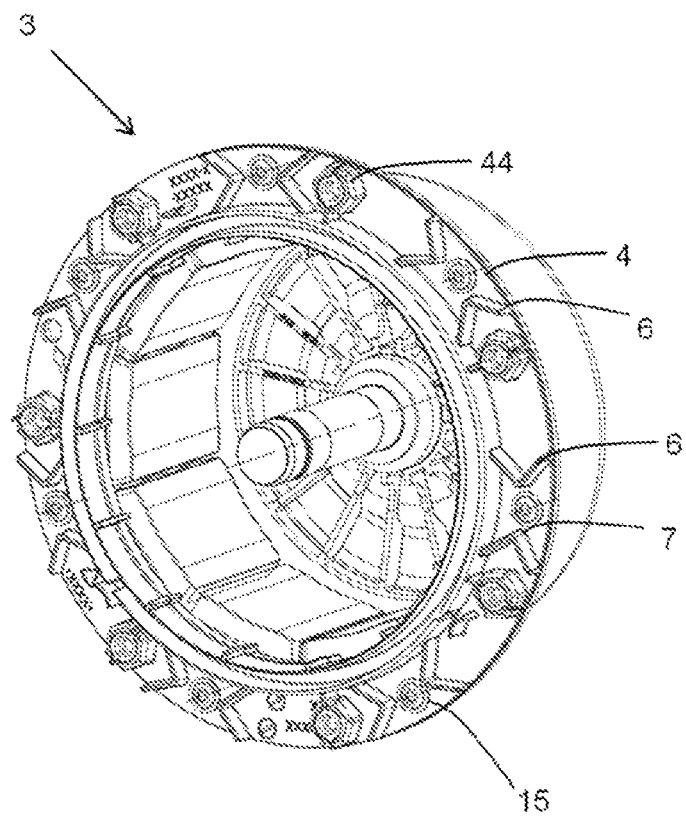
Figure 3:
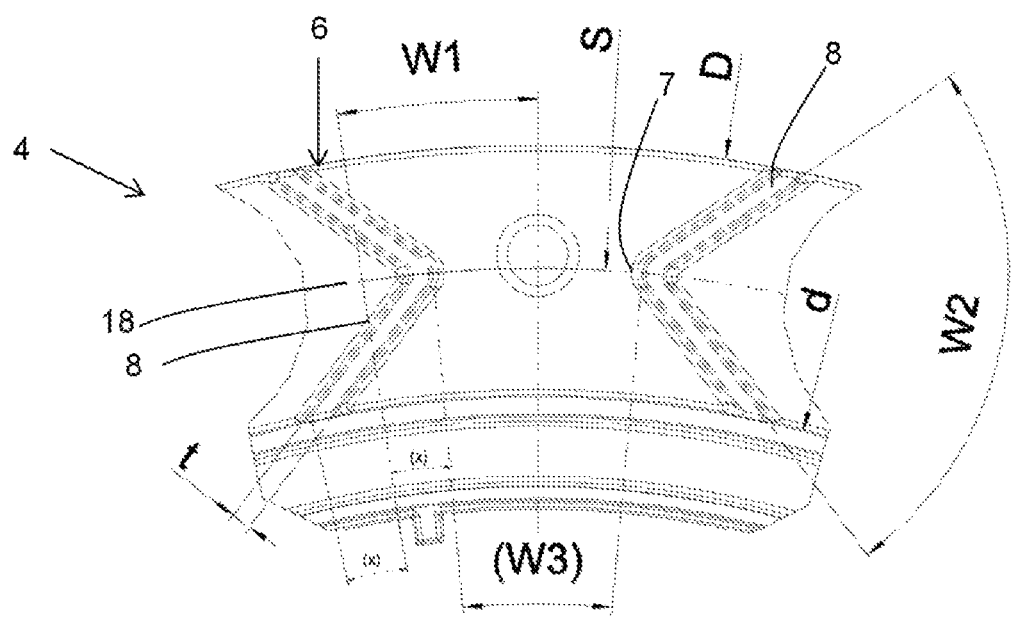
Figure 4:
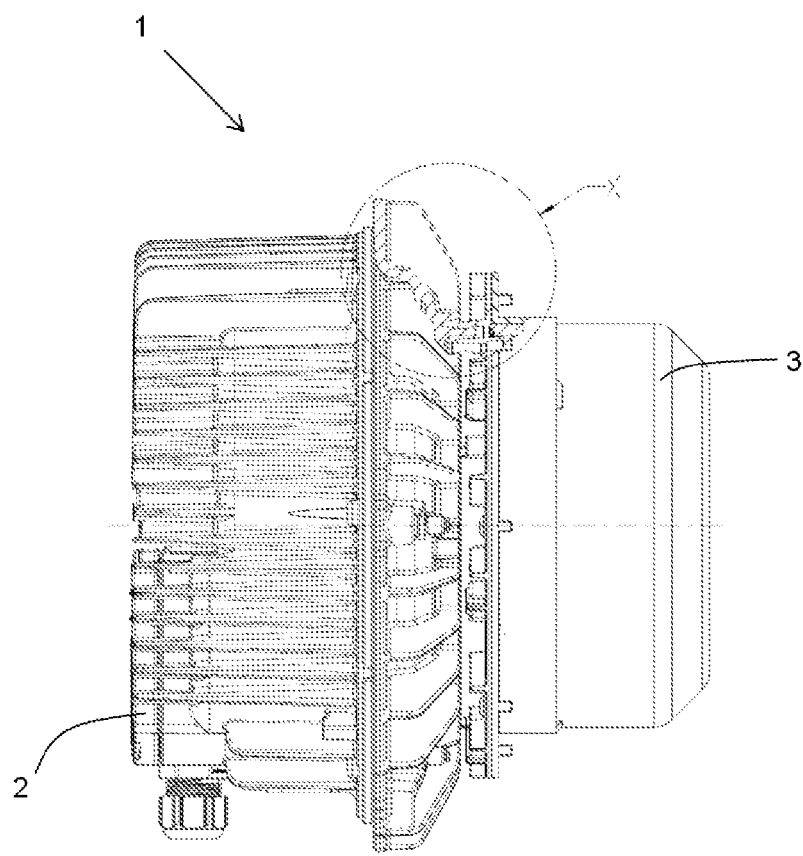
Figure 5:
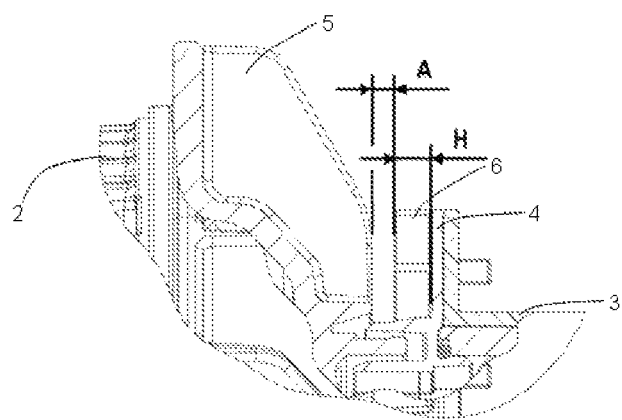
Figure 6:
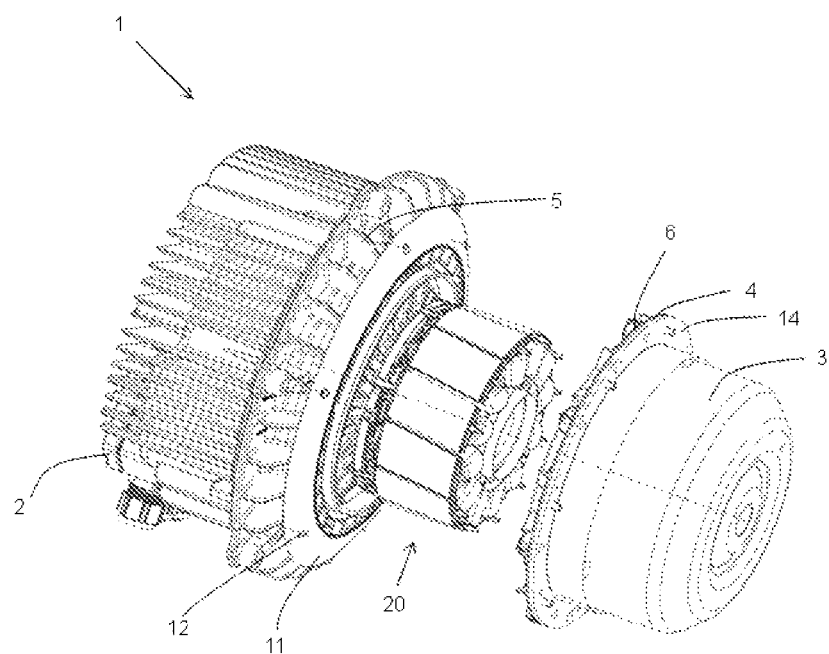
Figure 7:
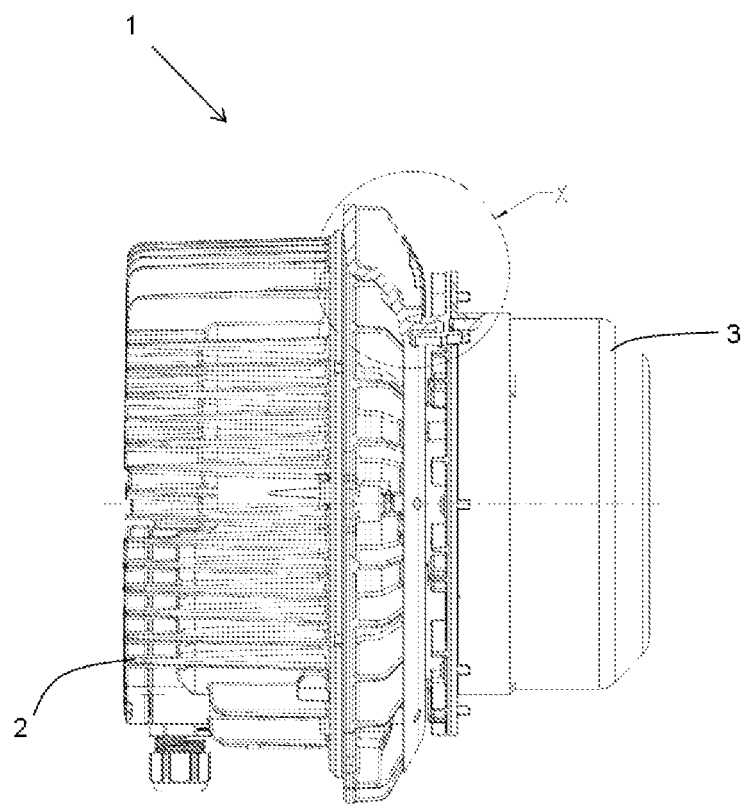
Figure 8:
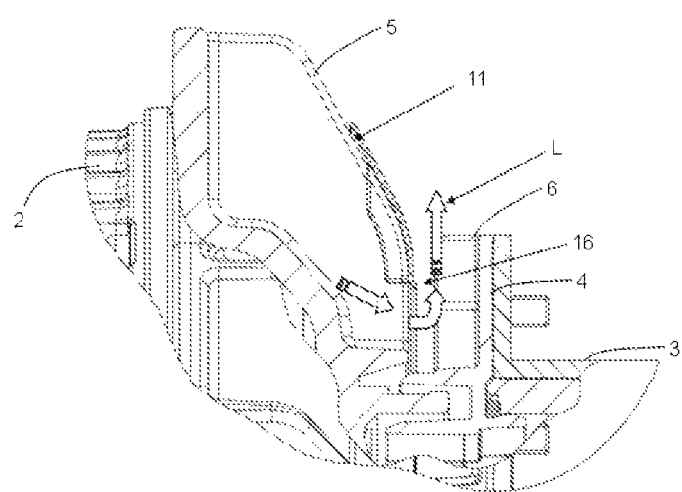

FIG. 1 illustrates an electric motor in an exploded view;
FIG. 2 is a perspective view of the rotor housing;
FIG. 3 is a detail view of the cooling ring;
FIG. 4 is a lateral partial cross sectional view of the electric motor;
FIG. 5 is a detail from FIG. 4;
FIG. 6 illustrates a different embodiment of an electric motor, in an exploded view;

FIG. 7 is a lateral partial cross sectional view of the electric motor according to FIG. 6; and FIG. 8 is a detail from FIG. 7.

In all of the views, the same reference numerals are used to represent similar components.

In FIG. 1, a first exemplary embodiment of the electric motor 1 is illustrated, in the form of an "external rotor motor", in a partially exploded view. The stator 20 is disposed in the stator housing 2. The stator housing 2 has cooling fins 5 which extend radially outwardly and which are distributed around the periphery of the stator 20. The cooling fins 5 are configured as web members, with their axial height increasing radially outward, so that an axial offset is formed. The rotor housing 3, which forms the external rotor and which surrounds the stator 20, is sealingly attached to the stator housing 2 by means of a labyrinthine seal. The rotor housing 3 has a flange 14 to which the cooling ring 4, comprised of plastic material, is mounted.

FIG. 2 is a perspective view of the rotor housing 3 with the cooling ring 4 attached to it. A plurality of V-shaped cooling ribs 6 (also referred to as "cooling wings") are distributed over the circumference of the cooling ring 4; these are distributed in the circumferential direction and act as "cooling wings" when the external rotor is in rotational operation. Each respective pair of V-shaped cooling ribs 6 (cooling wings) is configured with the apices 7 of the ribs facing one another in the circumferential direction, in a unit construction on the cooling ring 4. A total of seven pairs of cooling ribs are distributed at equal intervals on the cooling ring 4. The total number of the V-shaped cooling ribs 6 (cooling wings) is thus significantly less than the total number of cooling fins ribs 5 on the stator housing 2. However, also mounting nuts 44 are provided which likewise achieve a cooling effect, so that the number of V-shaped cooling ribs 6 (cooling wings) is further reduced. To the extent that, in a given embodiment, no mounting nuts 44 are provided, the number of cooling ribs 6 will be increased correspondingly. The cooling ring 4 is attached to the flange 14 of the stator housing 3 via screws 15. The screws 15 are disposed between respective pairs of V-shaped cooling ribs 6 (cooling wings) which V-shaped ribs are directed toward each other.

Referring to FIG. 3, the geometry of the V-shaped cooling ribs 6 (cooling wings) on the cooling ring 4 is illustrated in more detail with the example of a pair of cooling ribs 6 which are directed toward each other. The other pairs are configured identically. The two legs 8 of the respective V-shaped cooling ribs 6 (cooling wings) which form the "V" have mirror symmetry with respect to the circumferential line 18 of the cooling ring 4. The respective apices 7 of the V-shaped cooling ribs 6 (cooling wings) terminate on the cooling rib middle diameter S, which extends centrally between the cooling rib outer diameter D and the cooling rib diameter $\underline{d}$ of the V-shaped cooling ribs 6 (cooling wings). The tips 7 directed toward each other have an angular separation "(W3)" of more than 10° in the circumferential direction. In the axial plan view shown, the V-shaped cooling ribs 6 (cooling wings) each extend up to a radial outer edge of the cooling ring 4, and their ends are flush with the latter. The legs 8 of the V-shaped cooling ribs 6 (cooling wings) have a leg thickness $\underline{t}$ of 1.5 mm. The angular separation W1 of the respectively adjacent and mutually facing V-shaped cooling ribs 6 (cooling wings) is determined by the number of V-shaped cooling ribs 6 (cooling wings) on the cooling ring 4; in the embodiment illustrated this angular separation is 8.6°. A corresponding distance $\underline{x}$ from the respective tip 7 and the circumferentially opposite end of the V-shaped cooling rib 6 is used as the measuring point. The opening angle W2 of the V-shaped cooling ribs 6 (cooling wings) is 80°.

In FIG. 4, a lateral partial cross sectional view of the electric motor 1, which has been assembled and is ready for operation, is illustrated, and a detail X from FIG. 4 at the ring-shaped gap between the stator housing 2 and the rotor housing 3 is shown in FIG. 5. A spacing A is provided between the V-shaped cooling ribs 6 (cooling wings) on the cooling ring 4 and the radially straight outwardly extending cooling fins 5 on the stator housing 2, which spacing is defined by the open width (open distance) between the axially oppositely disposed radially straightly outwardly extending cooling fins 5, on the one hand, and the V-shaped cooling ribs 6, on the other hand. The V-shaped cooling ribs 6 (cooling wings) have an axial cooling rib height $\underline{H}$ which is twice as large as the spacing A. The spacing A is further determined such that its minimum value is lower by a factor of at least 0.015 times the outer diameter $\underline{D}$ of the cooling ring, i.e. $A_{min}=D*0.015$. The maximum spacing $A_{max}=A_{min}\times 1.5$. For an exemplary cooling ring 4 with a cooling rib outer diameter $\underline{D}$ of 230 mm, the spacing is $A_{min}=3.45$ mm and $A_{max}=5.175$ mm. A cooling air flow along the cooling fins 5 on the stator housing 2 is produced by the rotation of the outer rotor with the cooling ring 4, as a result of which the electronic components in the stator housing 2 are cooled.

FIGS. 6 to 8 illustrate a different embodiment; the features identified with respect to FIGS. 1 to 5 apply here as well, mutatis mutandis. In addition, an annular disc-shaped inlet nozzle (inlet nozzle element) 11, the surface of which facing the V-shaped cooling ribs 6 (cooling wings) is smooth (even), is disposed on the stator housing 2 on the radially outwardly extending cooling fins 5. In an alternative embodiment (not shown), the surface has a corrugated shape. The inlet nozzle 11 is fastened, e.g., by means of screws, which, however, are completely countersunk into countersink holes 12 in order not to influence the flow. As can be seen in FIGS. 6 and 8, the inlet nozzle 11 is designed as an annular disc which has a shape which is complementary to the radially outwardly extending cooling fins 5, so that it is supported over its entire radial extension on the axial outer surfaces of the radially outwardly extending cooling fins 5. In this connection, the inlet nozzle 11 has the same bending (curvature) as the axial outer surfaces of the cooling fins 5. However, the inlet nozzle 11 does not extend over the entire length of the cooling fins 5, but rather it is disposed in the radial middle region of the cooling fins 5, so that the radially outwardly extending cooling fins 5 extend beyond the inlet nozzle 11 on both sides. In this way, a kind of channel 16 can be produced, and the air stream L shown in FIG. 8 can be aspirated (sucked) over the radially outwardly extending cooling ribs 5 and can be blown radially outward. Furthermore, in a further embodiment (not shown), the channel can also be lengthened axially and can be guided through and/or along the stator housing 2 so that a cooling air flow stream can be achieved along the electronic components in the stator housing 2 via the cooling ring 4 and the flow generated by it.

The possible embodiments of the invention go beyond the scope of the above-described preferred exemplary embodiments. Numerous variants are conceivable which embody the described solution in basically different manners. To the extent that cooling fins and the like which extend radially outward are referred to, the scope of the description also extends to embodiments of cooling fins and the like with curved shapes, e.g. in the form of S curves, forward curves, or rearward curves.

The invention claimed is:

1. An external rotor motor comprising:
a stator housing and
a rotor housing rotatable with respect to the stator housing, the rotor housing having a cooling ring disposed on a side which axially faces the stator housing, wherein the stator housing and the cooling ring each bear a plurality of first and second cooling fins which face each other axially and are disposed so as to be distributed in respective circumferential directions,
the first and second cooling fins collaborate in flow technology when the rotor housing is in a rotating operation;
when viewed in an axial plan view the first cooling fins extend radially outwardly, and the second cooling fins are V-shaped with their apexes directed in the circumferential direction,
a rotary relative movement of the first and second cooling fins generates a cooling air stream, at least between the stator housing and the rotor housing and
each pair of neighbouring V-shaped cooling fins has its respective apexes directed toward each other in the circumferential direction.

2. The electric motor according to claim 1, wherein the total number of radially outwardly extending cooling fins is greater than the total number of the V-shaped cooling fins, by a factor of 1.2 to 1.8.

3. The electric motor according to claim 1, wherein the cooling fins which have a V-shape when viewed in an axial plan view are of a unit construction with the cooling ring.

4. The electric motor according to claim 1, wherein the cooling fins which have a V-shape when viewed in an axial plan view extend up to a radially outer edge of the cooling ring, and their respective ends are flush with said outer edge.

5. The electric motor according to claim 1, wherein an angular separation W1 between neighbouring mutually facing V-shaped cooling fins is determined by the number of V-shaped cooling fins, wherewith the angular separation W1 can be calculated from the formula:

Angular separation W1=360°/(Total number of V-shaped cooling fins)/2.

6. The electric motor according to claim 1, wherein an angle of opening W2 of the V-shaped cooling fins has a value in a range of 50-90°.

7. The electric motor according to claim 1, wherein an angular separation W3 in the circumferential direction between two neighbouring apexes of V-shaped cooling fins which apexes are directed toward each other is at least 8°.

8. The electric motor according to claim 1, wherein the legs of the V-shaped cooling fins have mirror symmetry with respect to a circumferential line of the cooling ring.

9. The electric motor according to claim 8, wherein the legs of the V-shaped cooling fins have a leg thickness t of 0.8 to 3 mm.

10. The electric motor according to claim 1, wherein an axial spacing A determined by the open width between axially opposite radially outwardly extending fins and V-shaped cooling fins is less than the outer diameter D of the cooling ring by a factor of 0.015, i.e. A=D*0.015.

11. The electric motor according to claim 10, wherein the V-shaped cooling fins have an axial cooling fin height H that is greater than the axial spacing A by a factor of 2 to 2.5.

12. The electric motor according to claim 1, wherein an inlet nozzle in the form of a ring-shaped disc is disposed on the radially outwardly extending cooling fins, the surface of which disc which faces the V-shaped cooling fins is smooth or has a corrugated shape.

13. The electric motor according to claim 12, wherein the inlet nozzle, in a radially middle region, is disposed against the radially outwardly extending cooling fins, such that said radially outwardly extending cooling fins extend beyond the inlet nozzle on both sides in the radial direction.

14. The electric motor according to claim 12, wherein the inlet nozzle has a shape which is complementary to the radially outwardly extending cooling fins, wherewith said inlet nozzle is disposed against said radially outwardly extending cooling fins over the inlet nozzle entire radial extent.

15. The electric motor according to claim 14 wherein the inlet nozzle, in a radially middle region, is disposed against the radially outwardly extending cooling fins, such that said cooling fins extend beyond the inlet nozzle on both sides in the radial direction.

* * * * *